(12) United States Patent
Gruttadauria et al.

(10) Patent No.: US 6,971,090 B1
(45) Date of Patent: Nov. 29, 2005

(54) COMMON INFORMATION MODEL (CIM) TRANSLATION TO AND FROM WINDOWS MANAGEMENT INTERFACE (WMI) IN CLIENT SERVER ENVIRONMENT

(75) Inventors: Brian R. Gruttadauria, Sutton, MA (US); Andreas L. Bauer, Maynard, MA (US); Gregory W. Lazar, Upton, MA (US); Munish T. Desai, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 629 days.

(21) Appl. No.: 09/877,287

(22) Filed: Jun. 8, 2001

(51) Int. Cl.$^7$ .............................................. G06F 9/45
(52) U.S. Cl. ........................ 717/136; 717/127; 709/203
(58) Field of Search ................................ 717/100, 101, 717/108, 114–116, 170, 177, 120–122, 124–128, 717/136; 709/223, 230, 200–203

(56) References Cited

U.S. PATENT DOCUMENTS

| | | | |
|---|---|---|---|
| 5,075,847 A * | 12/1991 | Fromme ..................... | 717/136 |
| 6,199,195 B1 * | 3/2001 | Goodwin et al. ........... | 717/104 |
| 6,226,792 B1 * | 5/2001 | Goiffon et al. ............. | 717/120 |
| 6,317,748 B1 * | 11/2001 | Menzies et al. ........ | 707/103 X |
| 6,480,882 B1 * | 11/2002 | McAdam et al. .......... | 709/202 |
| 6,493,719 B1 * | 12/2002 | Booth et al. ............ | 707/103 X |
| 6,505,342 B1 * | 1/2003 | Hartmann et al. .......... | 717/104 |
| 6,601,234 B1 * | 7/2003 | Bowman-Amuah ......... | 717/108 |
| 6,742,059 B1 * | 5/2004 | Todd et al. .................... | 710/19 |
| 6,754,664 B1 * | 6/2004 | Bush .......................... | 707/102 |
| 6,785,882 B1 * | 8/2004 | Goiffon et al. ............. | 717/120 |
| 6,789,251 B1 * | 9/2004 | Johnson ...................... | 717/100 |
| 6,842,770 B1 * | 1/2005 | Serlet et al. ................ | 709/203 |
| 6,854,122 B1 * | 2/2005 | Sheriff et al. ............... | 719/316 |
| 6,862,736 B2 * | 3/2005 | Hudis et al. ................ | 719/316 |
| 6,871,346 B1 * | 3/2005 | Kumbalimutt et al. ...... | 718/104 |

OTHER PUBLICATIONS

Damiani et al, "Fine grained access control for SOAP E service", ACM WWW, pp 504-513, May 2001.*
Engelen, "Code generation techniques for developing light weight XML web services for embaded devices", ACM SAC, pp 854-861, Mar. 2004.*
Yoon et al, "Development of SNMP XML translator and gateway for XML based integarted network management", PP 259-276, International Journal of Network Management, 2003.*
Chaudhri et al, "On relational support for XML publishing: beyond sorting and tagging", ACM SIGMOD, pp 611-622, Jun. 2003.*
Ryan et al, "Using event based translaion to support dynamic protocol evolution", IEEE, Proc. of the 26$^{th}$ ICSE, pp 408-417, 2004.*
Rabinovich et al, "DHTTP: An efficient and cache friendly transfer protocol for the web", IEEE, Trans. on the Networking, vol. 12, No. 6, Dec. 2004.*

* cited by examiner

Primary Examiner—Anil Khatri
(74) Attorney, Agent, or Firm—Robert Kevin Perkins; Leanne J. Fitzgerald; John M. Gunther

(57) ABSTRACT

A protocol translator for use in a storage system or storage area network for translating between incompatible communication protocols. Apparatus, methodology, computer program product and interface embodiments are disclosed, and code examples are provided, for translating between Common Information Model/eXtensible Markup Language/Hyper Text Transfer Protocol (CIM/XML/HTTP) and Windows Management Interface/Distributed Component Object Model (WMI/DCOM) communication protocols for distributed management software used within a storage system or storage area network in a client server environment.

39 Claims, 5 Drawing Sheets

COMMON INFORMATION MODEL (CIM) TRANSLATION TO AND FROM WINDOWS MANAGEMENT INTERFACE (WMI) IN CLIENT SERVER ENVIRONMENT

BACKGROUND OF THE INVENTION

1. Field of the Invention

The present invention relates generally to management software in a client-server environment, and, more particularly, relates to translating first information formatted in Common Information Model/Extensible Markup Language (CIM/XML) received by the server from the client into second information in format compatible with Windows Management Interface (WMI), and translating vice-versa.

2. Description of Prior Art

The computer industry is evolving rapidly. Certain companies may have emerged as front-runners within that industry in their respective sectors. Those sectors include: semiconductor and semiconductor-equipment manufacturing, processor development, networking, storage systems, operating system software, application software, etc. This is an on-going competition and any current front-runner may have to accept secondary status tomorrow. One result of this vigorous competitive activity is that proprietary designs frequently emerge from one company which are not compatible with technological-designs of other companies. Accordingly, industry standards committees have evolved to try to bring uniformity to these different developmental directions where possible. One such committee is known as Distributed Management Task Force (DMTF) and has generated a particular standard called Web Based Enterprise Management (WBEM). This is a standard which certain industry participants want to meet, including those participants in distributed management software (for computer storage systems and storage area networks—SANs). A ninety-seven (97) page specification entitled "Common Information Model (CIM) Specification" Version 2.2, dated Jun. 14, 1999 prepared by DMTF offers more information about this subject and is incorporated by reference herein in its entirety; electronic copies of this specification can be obtained free of charge from the Internet at ftp://ftp.dmtf.org or http://www.dmtf.org. Another specification of eighty-seven (87) pages entitled "Specification for CIM Operations of HTTP" Version 1.0, dated Aug. $11^{th}$, 1999, prepared by DMTF likewise provides valuable background information and is also incorporated by reference herein in its entirety, (HTTP means Hyper Text Transfer Protocol).

In this context, consider software offered by the Microsoft company which designs, develops and markets many different software components. With specific reference to two such components, namely, its Internet Information Server (IIS) and its Windows Management Instrumentation Common Information Model Object Manager (WMI CIMOM), these are two independent, object-oriented software components. Each component is marketed separately from the other and each provides separate useful software functions. More information will be supplied about these two software components hereinbelow, after a brief discussion on the subject of software objects.

An object, in computer software terms, is a dedicated area of memory which can be thought of as an impervious container holding both data and instructions within itself, both defining itself and its relationships to other objects in the computer system or network. An object can send and receive messages to and from other objects, respond and react to such messages (e.g. commands) but shall normally be impervious to internal scrutiny. For example, in a storage processor (a kind of computer) each object may describe or relate to a specific detail in the processor (e.g. a fan, power switch, cache memory, power supply, disk drive interface, etc.), where these tangible objects in the storage processor can send messages to each other and to other objects outside the processor. The relationship between these specific objects in the storage processor is usually visualized or characterized as a "tree" of objects. In a tree, each such object hangs off a preceding object as if in a parent-child or inheritance relationship, with many children hanging from a parent not being an atypical configuration. In addition to these tangible kinds of objects, logical units (LUNs) are other nodes or objects that can be contained within the tree.

Certain purchasers (OEM manufacturers) of these IIS and WMI software components can use either one or both in computer-related systems developed and marketed to end-users by such purchasers. However each one of these software components separately does not meet the standards established by WBEM—each is not WBEM-compliant for various reasons including that each component currently uses Distributed Component Object Model (DCOM) to support objects distributed across a network instead of the WBEM-established standard of Extensible Markup Language (XML) to perform that same support function, although IIS does have some compatibility with XML.

Thus, there is a need amongst certain industry participants, including computer storage companies that supply distributed storage management software utilizing both of these IIS and WMI CIMOM software components in a client-server environment, to have both components meet the WBEM standard. The standard must be met in an efficient manner that does not negatively impact the participants' respective proprietary designs. Distributed storage management software normally runs on the client or user interface (UI) computer while, at the same time, it is also deployed and running as agent software on various network nodes such as servers. Servers can be connected between the client computer and the storage systems, or can be connected in the storage systems themselves or in the SANs. Accordingly, distributed storage management software can be run as agent software on storage processors (yet other computers) within such storage systems or SANs.

One prior art approach to meeting the WBEM standard is to write client software so it supports multiple communication protocols such as CIM/XML/HTTP on the one hand and DCOM on the other hand. This approach allows Windows clients the ability to access CIM data through WMI over DCOM. WMI is specific to Microsoft's Windows product and uses DCOM as its communication protocol. This approach is not open to other operating systems which do not support COM and WMI. Accordingly, this approach is limited since it still only provides support for client computers running Windows software. Moreover, this brute-force approach to a solution presents a significant and costly development effort. Thus, a more elegant, generic and permanent solution is needed, with flexibility to accommodate virtually any communication protocol, and the welcome solution of the present invention satisfies this need.

SUMMARY OF THE INVENTION

Embodiments of the present invention relate to apparatus, method, interface, and/or computer program product operating within a storage system employed in a client server network to accomplish the following: First information is received in the storage system in accordance with a first communication protocol from the client. The first protocol is determined as acceptable to allow further processing of the first information in the system. The first information is translated into second information compatible with a second communication protocol. An object manager operates in accordance with the second protocol. The second information is forwarded to the object manager and in response to the object manager managing the second information a managed response thereto is received. The managed response is reverse-translated into its equivalent response compatible with the first protocol. The equivalent response is forwarded to the client.

In an apparatus embodiment of the present invention, to be operated within a client-server network employing a storage area network including at least one storage system, the apparatus functions to interface between a first communication protocol and a second communication protocol. The apparatus includes a first information receiver for receiving first information in accordance with the first protocol from the client, a first protocol acceptor for determining that the first protocol is acceptable to allow further processing of the first information in the system, a first information translator for translating the first information into second information compatible with the second protocol, an object manager, for example WMI, operative in accordance with the second protocol, forwarding and receiving apparatus for forwarding the second information to the object manager and responsive to the object manager managing the second information for receiving a managed response thereto from the object manager, a reverse translator for reverse-translating the managed response into an equivalent response compatible with the first protocol, and an equivalent response forwarder for forwarding the equivalent response to the client.

In a computer program product embodiment of the present invention to be operated within a client-server network employing a storage area network including at least one storage system, the computer program product functions to interface between a first communication protocol and a second communication protocol and comprises program code for accomplishing this function.

In a further feature of the present invention, the first protocol is WBEM'S CIM/XML/HTTP and the second protocol is WMI/DCOM.

In yet an additional feature of the present invention, a plurality of acceptable protocols are established. The first protocol is compared against the plurality of acceptable protocols seriatim until the first protocol matches one of the plurality of protocols. In response to the comparison further processing is allowed.

It is thus advantageous to utilize embodiments of the present invention to automatically achieve communication protocol compatibility between client communication protocol and storage system communication protocol. It is a further advantage to utilize embodiments of the present invention to automatically achieve communication protocol compatibility between any one of several client communication protocols and any one of several storage system communication protocols.

It is thus a general object of the present invention to provide an improved storage system within a client-server network.

It is another object of the present invention to provide improved storage management software usable on a storage system within a client server environment.

It is a further object of the present invention to resolve incompatibility between two incompatible communication protocols.

It is yet another object of the present invention to provide a translator within a computer storage system utilizing both CIM/XML and WMI communication protocols, to translate therebetween in such a manner that operation of the storage system is not negatively impacted.

Other objects and advantages will be understood after referring to the detailed description of the preferred embodiments and to the appended drawings wherein:

DESCRIPTION OF THE PREFERRED EMBODIMENTS

Figure 1:
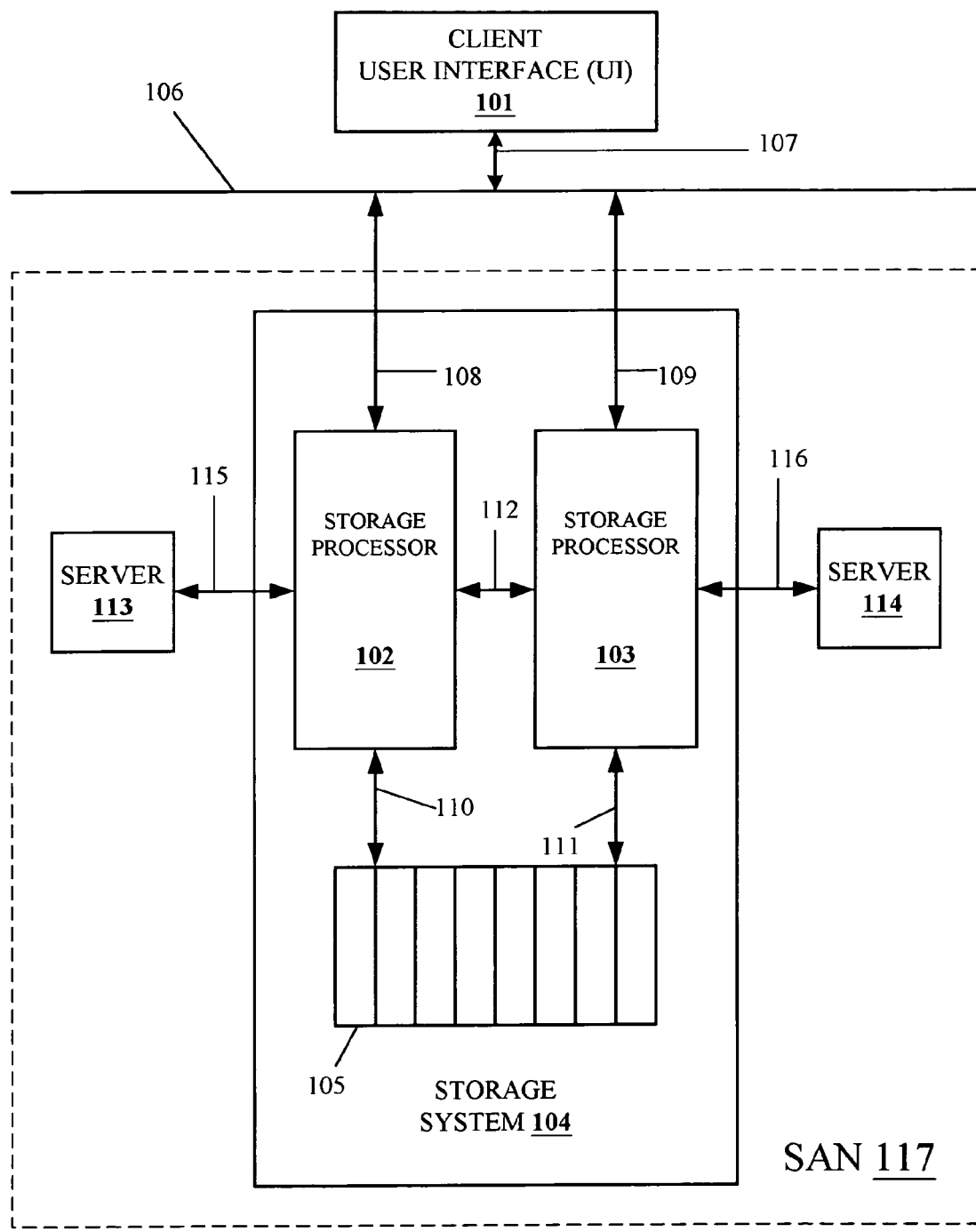
FIG. 1 is a block diagram of a storage system within a client server environment of the type in which embodiments of the present invention may be utilized.

FIG. 1—Client-Server Block Diagram

In referring to FIG. 1, there is shown a block diagram of an exemplary storage system within a client server environment of the type in which embodiments of the present invention may be utilized. Client or User Interface (UI) 101 is shown connected by bidirectional bus 107 to public Local Area Network (LAN) bus 106. Also shown is storage system 104 containing two storage processors (SPA & SPB) 102 and 103 and a disk array 105 which could be of the Redundant Array of Independent Disks (RAID) type. The server or servers (not shown in this Figure) are software components located within the storage processors. Storage processors 102 and 103 are connected from LAN 106 by bidirectional busses 108 and 109 respectively and are connected to disk drive or disk array 105 via two bidirectional busses 110 and 111 respectively. In addition, the two storage processors are interconnected within the storage system by way of bidirectional bus 112. More than two storage processors and more than one disk drive or disk array can be used with embodiments of the present invention and the specific configuration of FIG. 1 is for exemplary purposes only. Typically, all of these busses can be compatible with Small Computer System Interface (SCSI) or other Internet-compatible bus protocol.

FIG. 1 further depicts storage area network (SAN) 117 which includes storage system 104, as well as servers 113 and 114. Server 113 is operatively coupled to storage processor 102 by way of bidirectional bus 115. Server 114 is operatively coupled to storage processor 103 by way of bidirectional bus 116. More than two storage area network servers could have been operatively coupled together with storage system 104, but only two are shown to enhance clarity of presentation. Servers 113 and 114 can serve client 101 through other connectivity (not shown) or could serve other clients (not shown) connected with this network and/or with other networks. UI 101 may select a single management point for managing storage system 104 or SAN 117 in accordance with disclosure of U.S. patent application Ser. No. 09/798,571 filed Mar. 3, 2001, entitled: "Single Management Point for a Storage System or Storage Area Network", having assignee common with that of this instant patent application, and incorporated by reference herein in its entirety.

In operation, UI 101 forwards commands and data to SPA 102 and SPB 103 over bidirectional busses 107, LAN 106, 108 and 109. SPA 102 and SPB 103 interact via bidirectional bus 112 in a manner described in the incorporated by reference application where one or the other storage processor is the selected portal processor. Assume SPA 102 is selected to be portal processor and process input from client 101. Output of SPA 102 via bus 110 to disk array 105, may be a command which either writes data into or reads data from disk array 105, or which commands certain of these disks to perform other appropriate tasks. If communication protocol supporting both the command from UI 101 and the return information from disk array 105 is compatible throughout the communication path, then information flow in both directions is accurate, allowing the required task to be carried-out to its final and accurate conclusion. However, if such protocol is not compatible throughout, under certain circumstances embodiments of the present invention can be utilized within the storage processors to automatically adjust for protocol differences by way of suitable translation operations in both directions (from Client to disk array and vice versa). Embodiments of the present invention have particular utility in facilitating information flow which would otherwise be inhibited because of protocol differences ascribed to CIM/XML on the one hand and to WPI on the other hand, to be described in more detail hereinbelow (designations "CIM/XML" and "XML/CIM" are intended to be identical and interchangeable herein).

Figure 2:
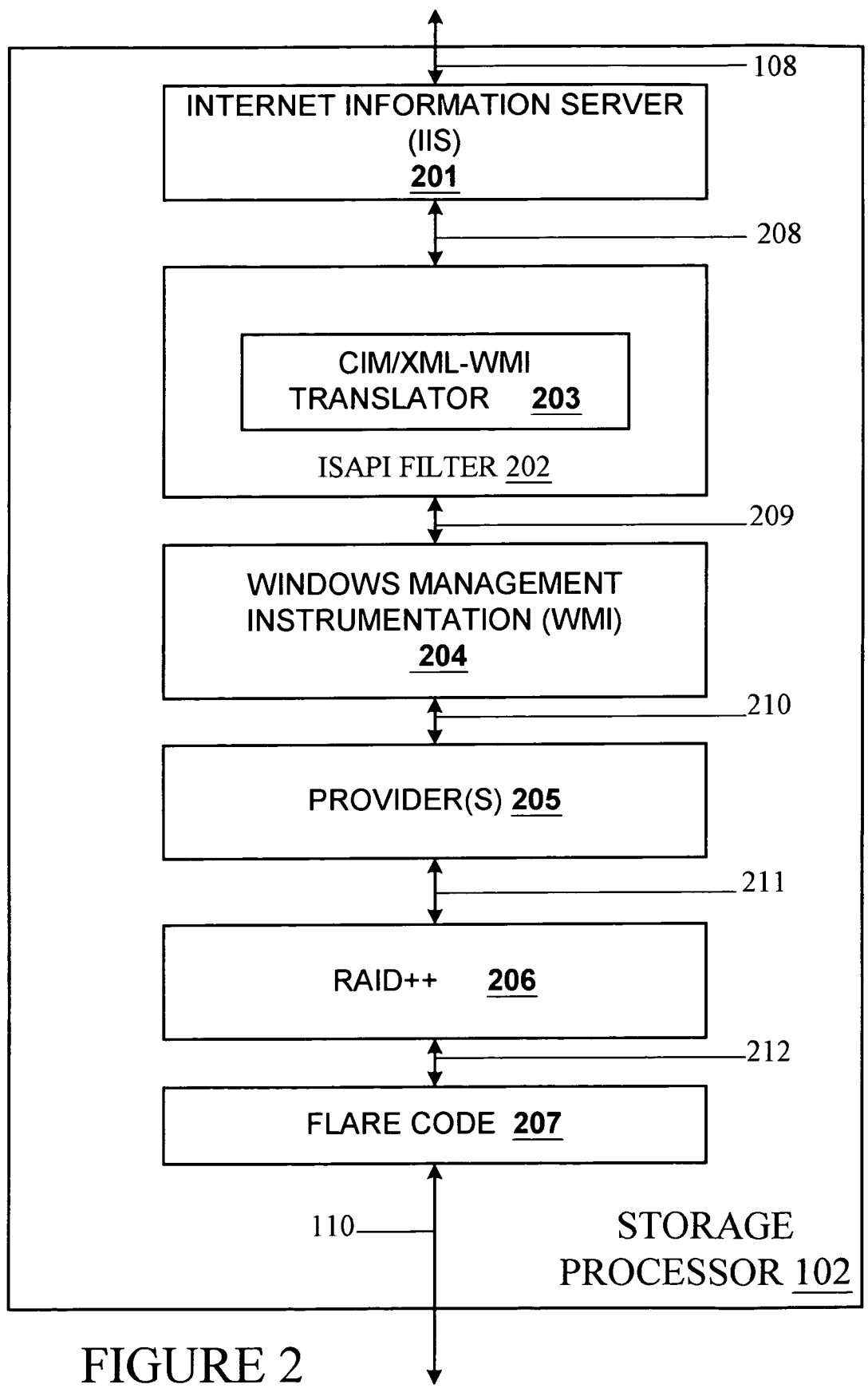
FIG. 2 is a schematic diagram of certain functional components contained within a storage processor located within the storage system of FIG. 1.

FIG. 2—Storage Processor Schematic

FIG. 2 is a schematic diagram of certain functional software components contained within each storage processor located within the storage system of FIG. 1. Bidirectional bus 108, shown in FIGS. 1 and 2, is operatively coupled to Internet Information Server (IIS) 201. This server is a software component that runs on Microsoft's Windows platforms. The output of IIS 201 is operatively coupled to the input of Internet Server Application Programmer Interface (ISAPI) filter 202, and contained within that filter is Windows Management Interface (WMI) translator 203. ISAPI enables programmers to develop Web-based applications that run faster than conventional Common Gateway Interface (CGI) programs. A filter in this context means a functional software component that can modify operation of the web server (IIS 201) itself. At several points in the servicing of a request from a client, a server can call into each dynamic link library (DLL) of an ISAPI filter and allow each such DLL to have an opportunity to intervene in (or "filter") the processing of such request. The filter can override various actions which otherwise would have proceeded without such filtering. WMI translator 203 is software which receives an informational input in accordance with a first protocol, and in this example in accordance with CIM/XML protocol format, and translates that input into equivalent information represented by a second protocol, and in this example in accordance with WMI protocol format. The output of ISAPI filter 202 is operatively coupled by bidirectional bus 209 to the input of WMI object manager 204, the output of which is operatively coupled via bidirectional bus 210 to other software components that are needed to operate disk drives 105.

These other software components are: provider(s) 205, RAID++206, and flare code 207. A WMI provider is an object-oriented database that provides data about applications, devices, and other sources of system information. Unlike a standard relational database, it supports classes, instances of those classes, and inheritance relationships between classes. Many of the terms used by WMI map fairly well to the relational database concepts. However, WMI offers features that a relational database does not offer, and vice versa. For example, unlike standard relational databases, WMI can retrieve instances of classes either by reading the repository (a persisted description of the objects WMI manages), or by calling a COM object to retrieve the information directly. Other generic software components that properly interface between WMI 204 and a suitable schema could be used instead of provider(s) 205. Output of provider(s) 205 is shown operatively coupled to RAID++206. RAID++206 is a proprietary schema written in C++. Other generic schemas in C++ language that would appropriately interface between providers 205 and flare code 207 could be used. The output of RAID++206 is provided via bidirectional bus 212 to proprietary flare code 207. Flare code is the storage arrays' internal firmware containing detailed computer code. Flare code provides machine language input to disk array 105 via bidirectional bus 110 shown in both FIGS. 1 and 2. Other generic code which would be operable to provide appropriate machine language input to the disk arrays could be used.

In operation, first information, such as WBEM's CIM/XML/HTTP, the preferred standard, from Client 101 is forwarded via bidirectional bus 108 into storage processor 102 where it is received and operated upon by IIS server 201. This server is not designed to recognize this preferred standard protocol input, although it does operate properly with HTTP. There are no components within IIS that allow translation or manipulation of such formatted input data in such a manner that it can be made sensible to the server. However certain filters can be used with IIS as shown by ISAPI filter 202 which is a generic filter in which one can specify a sequence by which specific filters provided within ISAPI 202 are run. (Although ISAPI filter 202 is shown in FIG. 2 as being subsequent to IIS in terms of information flow from Client 101, in reality such filter works with IIS at the time of arrival of input information on bus 108.) For example, a CIM filter can be selected from several filters to run first, whereupon this particular preferred standard input information or packet is immediately determined to be appropriate for this server. Thereafter, between the functions represented by IIS 201 and ISAPI 202, this XML-format information is put into a structure enabling further manipulation of that input. Structure into which such input is placed is either: (1) Document Object Model (DOM) which is an in-memory representation of XML data—it defines what attributes are associated with each object and how objects and attributes can be manipulated, or (2) a Simple API for XML (SAX) which is an application programmer's interface used by programmers for accessing and extracting data in XML documents. Both structures will work, but the best mode now known uses SAX rather than DOM for various reasons including improved performance. SAX allows processing as a set of events whereby one can key off certain object attributes and perform a desired action, requiring minimal interaction with memory. Such a design does not pay a penalty of loading this information into memory, perusing through it, and then dumping it out of memory for each new input information received. Instead, through SAX, these inputs are processed as an actual stream of data, and SAX allows the filtering function to be based on publicly defined CIM "tags" located in headers of the information inputs. The ISAPI filter either accepts the tags, which will be well-formed and will allow build-up of the WMI call to be described, or it will reject the tags based on incorrect format which builds up an error response which is sent back to IIS, also to be described.

WMI 204 is a Microsoft software component which uses Distributed Component Object Model (DCOM) which is an extension of Component Object Model (COM) to support objects distributed across a network. Unfortunately, however, this model was rejected by DMTF and therefore does not meet the WBEM standard. DCOM is thus not compatible with CIM/XML protocol. However, embodiments of the present invention include translation of information in the CIM/XML protocol into the WMI protocol which connects properly with DCOM. This is accomplished in WMI translator 203 located functionally within ISAPI filter 202. WMI 204 is a standard software component available from Microsoft company, and its output forms the input to proprietary component Provider(s) 205. Providers 205, in turn, provide input to RAID++ 206 which, in turn, provide input to Flare code 207, the machine language which talks directly to disk array 105. Of course, the reverse flow of information, from arrays 105 to Client 101 also takes place, as when the disks are read or when operating state of the disks are being reported back to Client 101 under control of this management software.

To further explain operation of the components within SPA 102, consider the following information flow example from Client 101 to Disk Drives 105 and vice-versa. This example illustrates at a high level the operation of the ISAPI filter. It shows the CIM/XML/HTTP input received from IIS 201 which is passed into the filter. It shows how the filter makes a WMI call, how the result is parsed, and shows the response to be sent back to IIS 201. The input to translator 203 from IIS 201 is as follows:

TABLE I

CIM/XML/HTTP INPUT TO TRANSLATOR 203

```
<?xml version="1.0" ?>
<CIM CIMVERSION="2.0" DTDVERSION="2.0">
<MESSAGE ID="877" PROTOCOLVERSION="1.0">
    <SIMPLEREQ>
        <IMETHODCALL NAME="GetInstance">
        <LOCALNAMESPACEPATH>
            <NAMESPACE NAME="root" />
        </LOCALNAMESPACEPATH>
        <IPARAMVALUE NAME="InstanceName">
            <INSTANCENAME CLASSNAME="EMC_StorageSystem">
                <KEYBINDING NAME="CreationClassName">
                    <KEY VALUE
        VALUETYPE="string">EMC_StorageSystem</KEYVALUE>
                </KEYBINDING>
                <KEYBINDING NAME="Name">
                <KEYVALUE VALUETYPE=
                "string">Test_array</KEYVALUE>
                </KEYBINDING>
            </INSTANCENAME>
        </IPARAMVALUE>
        <IPARAMVALUE NAME="IncludeQualifiers">
            <VALUE>FALSE</VALUE>
        </IPARAMVALUE>
        <IPARAMVALUE NAME="LocalOnly">
            <VALUE>FALSE</VALUE>
        </IPARAMVALUE>
        <IPARAMVALUE NAME="IncludeClassOrigin">
```

TABLE I-continued

CIM/XML/HTTP INPUT TO TRANSLATOR 203

```
            <VALUE>FALSE</VALUE>
        </IPARAMVALUE>
        </IMETHODCALL>
    </SIMPLEREQ>
</MESSAGE>
</CIM>
```

The above CIM/XML call in Table I (input to translator 203) is converted to the following WMI call in the ISAPI Filter which is output from translator 203 and is input to WMI 204:

TABLE II

WMI CALL OUTPUT FROM TRANSLATOR 203, INPUT TO WMI 204

```
// Using the locator, connect to CIMOM and set the given namespace.
BSTR pNamespace = _bstr_t("\\\\.\\root\\cimv2");
if(pIWbemLocator->ConnectServer(pNamespace,
                NULL,//using current account for simplicity
                NULL,//using current password for simplicity
                0L,  // locale
                0L,  // securityFlags
                NULL,// authority (domain for NTLM)
                NULL,// context
                &m_pIWbemServices) == S_OK)
// Set the class name
CComBSTR bstr_className("EMC_StorageSystem");
IEnumWbemClassObject *pEnumStorageDevs = NULL;
// Get the list of instances.
HRESULT hRes = m_pIWbemServices->CreateInstanceEnum(
                bstr_className,  // name of class
                0,
                NULL,
                &pEnumStorageDevs);  // pointer to enumerator
// Now enumerate through the returned devices and find "Test_array"
IWbemClassObject *pStorageDev = NULL;
hRes = pEnumStorageDevs->Next(
                2000, // timeout in two seconds
                1,    // return just one storage device
                &pStorageDev, // pointer to storage device
                &uReturned);  // number obtained: one or zero
if(SUCCEEDED(hRes) && (uReturned == 1))
{
    VARIANT pVal;
    VariantClear(&pVal);
    // Get the "__RELPATH" system property.
    BSTR propName = SysAllocString(L"__RELPATH");
    hRes = pStorageDev->Get( propName,  // property name
                0L,
                &pVal,// output to this variant
                NULL,
                NULL);
    // Done with this object.
    if (pStorageDev) pStorageDev->Release( );
    // Add the path property to the output list.
    if (SUCCEEDED(hRes))
    outputList.AddTail(CString(V_BSTR(&pVal)));
}
```

The above WMI call in Table II which is output from Translator 203 is input to WMI 204. A typical output from WMI 204 which is input back into translator 203 is shown in Table III.

TABLE III

OUTPUT FROM WMI 204, INPUT TO WMI TRANSLATOR 203

```
void WriteXmlString(PHTTP_FILTER_CONTEXT pfc, char.*buffer)
{
```

TABLE III-continued

OUTPUT FROM WMI 204, INPUT TO WMI TRANSLATOR 203

```
DWORD bufferLength;
bufferLength = strlen(buffer);
WriteClient(pfc, buffer,
&bufferLength, 0);
}
void WriteProperties(PHTTP_FILTER_CONTEXT pfc, CList&
properties)
{
POSITION pos = properties.GetHeadPosition( );
if (pos) {
WriteXmlString(pfc, "<CIM CIMVERSION=\"2.0\" DTDVERSION=
\"2.0\">");
WriteXmlString(pfc, "<MESSAGE ID="877" PROTOCOLVERSION=
\"1.0\">");
WriteXmlString(pfc, "<SIMPLERSP>");
WriteXmlString(pfc, "<IMETHODRESPONSE NAME=
\"GetInstance\">");
WriteXmlString(pfc, "<IRETURNVALUE>");
WriteXmlString(pfc, "<INSTANCE CLASSNAME=
\"EMC_StorageSystem\">");
// now write out the properties
int i;
for (int i=0;i < myList.GetCount( );i++)
BSTR propName = properties.GetNext(pos);
BSTR propValue = properties.GetNext(pos);
WriteXmlString(pfc,CString("PROPERTY NAME=\"") +
CString(propName)
+ CString("TYPE=\"string\" <VALUE>") + CString(propValue) +
CString("</VALUE></PROPERTY>"));
}
WriteXmlString(pfc, "</INSTANCE");
WriteXmlString(pfc, "</IRETURNVALUE");
WriteXmlString(pfc, "</IMETHODRESPONSE");
WriteXmlString(pfc, "</SIMPLERSP");
WriteXmlString(pfc, "</MESSAGE");
WriteXmlString(pfc, "</CIM");
}
```

Finally, the output from Translator 203 corresponding to the Table III input to the translator from WMI, and which is input back to Client or UI 101 via busses 108 and 107 is shown below in Table IV.

TABLE IV

CIM/XML/HTTP OUTPUT FROM TRANSLATOR 203

```
<CIM CIMVERSION="2.0" DTDVERSION="2.0">
<MESSAGE ID="877" PROTOCOLVERSION="1.0">
<SIMPLERSP>
<IMETHODRESPONSE NAME="GetInstance"><IRETURNVALUE>
<INSTANCE CLASSNAME="EMC_StorageSystem">
    <PROPERTY NAME="Interconnect"
    TYPE="string"><VALUE>Fibre</VALUE></PROPERTY>
    <PROPERTY NAME="CreationClassName"
    TYPE="string"><VALUE>EMC_StorageSystem</VALUE>
    </PROPERTY>
    <PROPERTY NAME="Name"
    TYPE="string"><VALUE>Srirams_array</VALUE>
    </PROPERTY>
    <PROPERTY.ARRAY NAME="Roles" TYPE="string">
        <VALUE.ARRAY>
            <VALUE>Block Server</VALUE>
        </VALUE.ARRAY>
    </PROPERTY.ARRAY>
    <PROPERTY NAME="Status" TYPE="string">
        <VALUE>Normal</VALUE>
    </PROPERTY>
    <PROPERTY NAME="Caption" TYPE="string">
        <VALUE>Storage System Test_array</VALUE>
    </PROPERTY>
    <PROPERTY NAME="Description" TYPE="string">
        <VALUE>Storage System Test_array</VALUE>
    </PROPERTY>
```

TABLE IV-continued

CIM/XML/HTTP OUTPUT FROM TRANSLATOR 203

```
</INSTANCE>
</IRETURNVALUE>
</IMETHODRESPONSE>
</SIMPLERSP>
</MESSAGE>
</CIM>
```

FIG. 3—Flowchart

Figure 3:
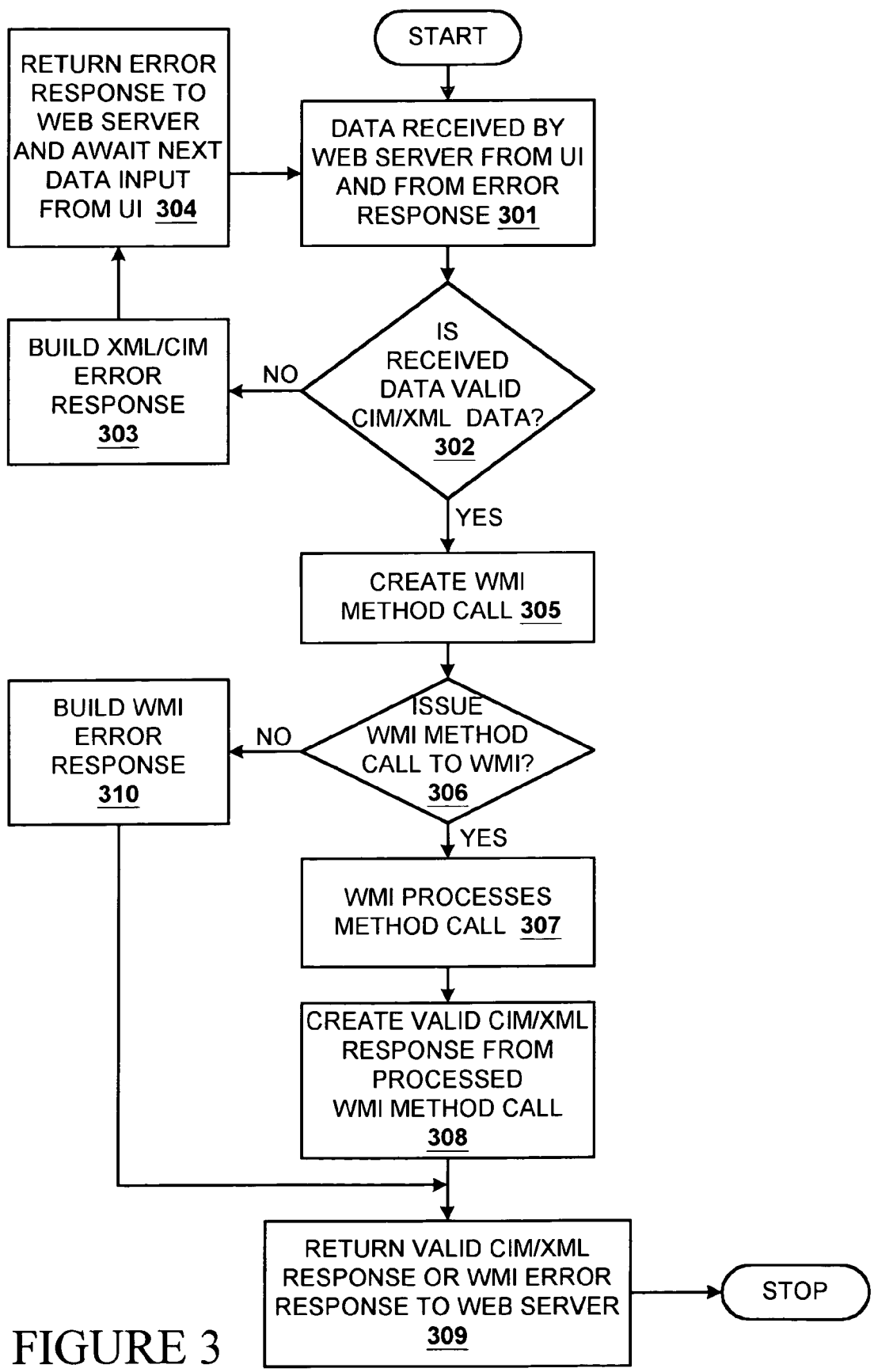
FIG. 3 is a flowchart illustrating the algorithm employed by the present invention.

Referring next to FIG. 3 which illustrates the algorithm implemented by embodiments of the present invention, it starts with data being received by a Web Server, e.g. IIS 201, from a client, e.g. UI 101 in step 301. This data or information is presented in a particular protocol and is compared with, or applied to, a particular CIM/XML filter in step or decision block 302. In that manner, a determination is made regarding whether or not such received data is valid CIM/XML data. If the answer is "no", the algorithmic process moves to step or process block 303 where an CIM/XML error response is built; from there it moves to block 304 where the error response is returned the web server and awaits next data input from the UI. But, if the answer to the query in block 302 is "yes", then the algorithmic process moves to step or block 305 where a WMI method call is created, (e.g., with respect to the prior code example, by operating on contents of Table I). The algorithmic process moves from there to decision block 306 where a query is made: issue WMI method call to WMI? If such method call is not issued (for reasons later discussed in connection with FIG. 4), an error response is built in step 310 and forwarded to step or block 309, about which detail is presented hereinbelow. But, if such method call is issued (e.g., with respect to the prior code example, contents of Table II forwarded to WMI 204), the algorithmic process moves to block 307 where WMI processes the method call (e.g., with respect to the prior code example, contents of Table III returned to Translator 203). The algorithmic process moves next to block 308 where a valid CIM/XML response is created from processed WMI method call. From there, the algorithmic process moves next to block 309 where such response is returned to the Web Server (e.g., with respect to the prior code example, contents of Table IV is returned). As noted above, step 309 also receives the error response that was built-up in step 310 and also returns such error response to the Web Server. The algorithm then stops and awaits the next data input at step 301.

The function represented by decision box 302 could be multiple protocol filters, e.g. CGI filter, CIM/XML filter, SOAP filter, etc., where the storage system could be prepared to handle virtually any protocol extant. Or, alternatively, the function represented by decision box 302 could be a single filter which could be manually changed to a different single filter depending on which application or protocol is of immediate interest to the user.

Figure 4:
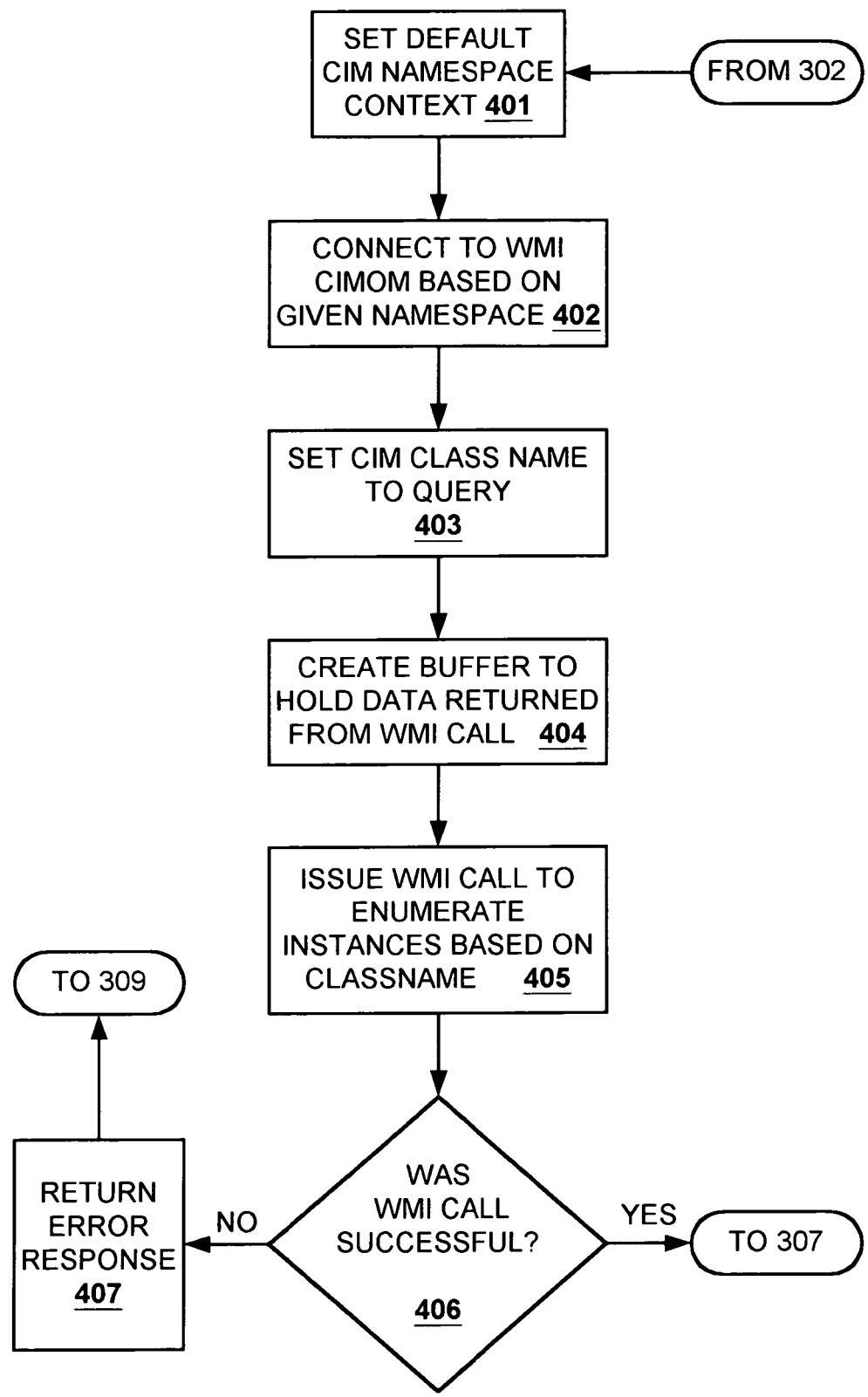
FIG. 4 is a flowchart illustrating in more detail the algorithm employed by certain of the steps of FIG. 3 in translating from CIM/XML to WMI; and, FIG. 5 is a flowchart illustrating in more detail the algorithm employed by certain of the steps of FIG. 3 in reverse-translating from WMI to CIM/XML

FIG. 4—Flowchart blocks 305/306

This flowchart illustrates the steps performed in blocks 305 and 306 of FIG. 3 in creating and issuing the WMI method call. In step 401, the default CIM namespace context is set. Accordingly, this default location is set. This is the memory location to which the WMI CIMOM (Windows Management Instrumentation—Common Information Model Object Manager) looks, in order to access its common information objects. If the common information model namespace is not set, CIMOM would not be able to locate the desired CIM object being sought. CIM takes an object-oriented approach to modeling information. Management information is expressed using, at least, class definitions, inheritance, instances, properties, and methods. CIMOM is software functioning as an object manager responsible for handling requests for these classes. Thus, there is a single service with a well defined mechanism for accessing CIM objects. The algorithmic process next moves to step 402 where connection is made to WMI CIMOM. Thereafter, the algorithmic process next moves to step 403 where the CIM classname is set to query. This means that the classname which is to be looked-up shall be added to the WMI application programmer's interface (API) call, in order to retrieve CIM data. The algorithmic process next moves to step 404 where a buffer is created to hold the data returned from the WMI call. In step 405, a WMI call is issued to enumerate instances based on classname which means that the WMI API call is actually made. The algorithmic process next moves to decision block 406 wherein the query is made: was the WMI call successful? The call could be unsuccessfull for various reasons such as, for example, classname does not exist, or provider is not installed. If the answer to the query is "no", step 407 returns an error response to block 309, but if "yes" the algorithmic process next moves to step 307 where WMI processes the method call, as detailed in the discussion regarding FIG. 3.

Figure 5:
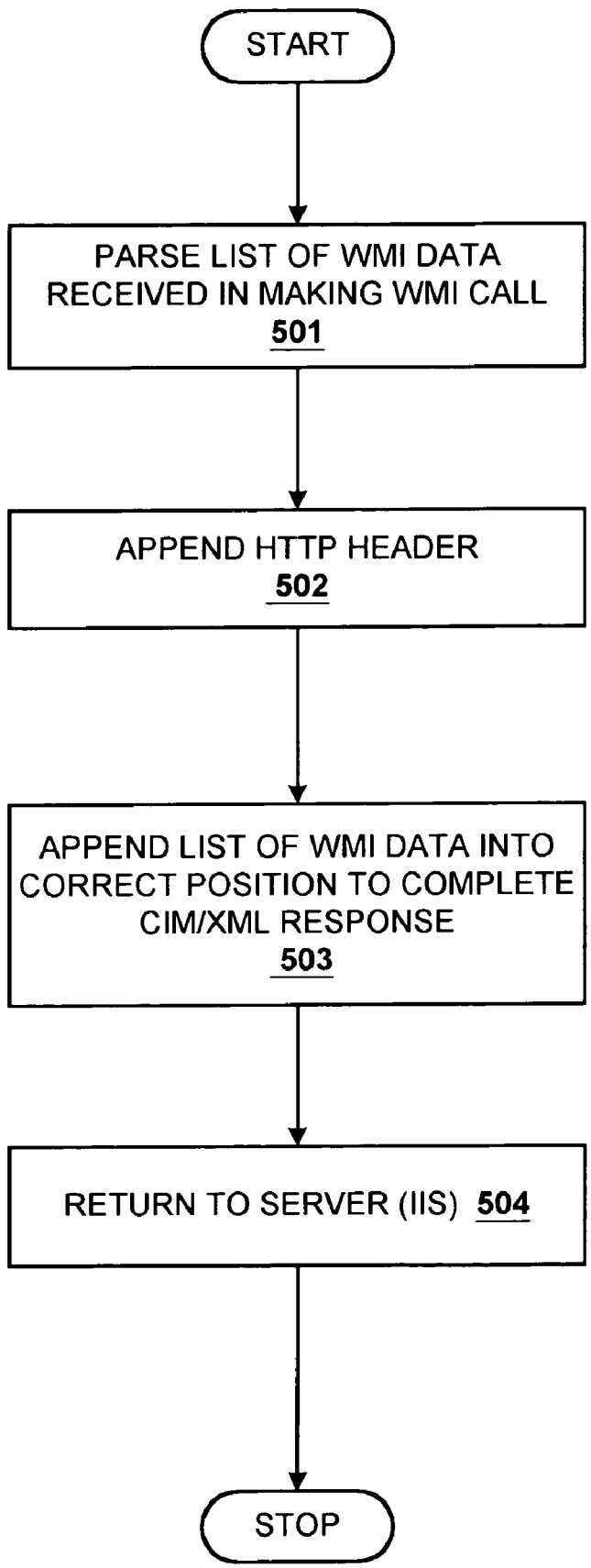

FIG. 5—Flowchart blocks 308/309

This flowchart details steps illustrated by blocks 308 and 309 in FIG. 3 and which are associated with code illustrated in Table III. Step 501 is initiated upon receipt of its input from block/step 307 of FIG. 3. In step 501 a list of WMI data received in making the WMI call is parsed. Next, in step 502, the HTTP header is appended to the parsed list. Finally, in step 503, the list of WMI data is appended into correct position to allow completion of CIM/XML response. Thereafter the algorithmic process moves to step 504 where it returns to server (IIS) and stops.

The present embodiments are to be considered in all respects as illustrative and not restrictive. In a particular configuration in which principles of the present invention are implemented, the operating system is Microsoft's Windows 2000, the language used is C++, the hardware used is an Intel-based model PIII 500 mhz PC computer supplied by vendor, Dell Corporation, and the storage system used is an EMC CLARiiON model FC4700 Disk Array. Other hardware and software can be combined to form systems in which the present invention can be implemented. The scope of the invention is indicated by the appended claims rather than by the foregoing description, and all changes which come within the meaning and range of equivalency of the claims are therefore intended to be embraced therein.

What is claimed is:

1. In a storage system employed in a client-server network, an interface operating between a first protocol and a second protocol, said storage system including object manager means operative in accordance with said second protocol, said interface comprising:

means for receiving first information in accordance with said first protocol from said client;

means, operatively coupled to said receiving means, for determining that said first protocol is acceptable to allow further processing of said first information in said system;

means, responsive to operation of said determining means, for translating said first information into second information compatible with said second protocol;

means for forwarding said second information to said object manager means and, responsive to said object manager means managing said second information, for receiving a managed response thereto from said object manager means;

means for reverse-translating said managed response into an equivalent response compatible with said first protocol; and, means for forwarding said equivalent response to said client.

2. The interface of claim 1 and wherein said first protocol is CIM/XML/HTTP.

3. The interface of claim 2 and wherein said second protocol is WMI/DCOM.

4. The interface of claim 3 and wherein said determining means further comprises:

means for establishing a plurality of acceptable protocols;

means for comparing said first protocol against said plurality of acceptable protocols seriatim until said first protocol matches one of said plurality of protocols; and, means, responsive to operation of said comparing means for allowing said further processing.

5. The interface of claim 1 and wherein said determining means further comprises:

means for establishing a plurality of acceptable protocols;

means for comparing said first protocol against said plurality of acceptable protocols seriatim until said first protocol matches one of said plurality of protocols; and, means, responsive to operation of said comparing means for allowing said further processing.

6. The interface of claim 5 and wherein the result of said operation of said comparing means not obtaining a match is that said further processing is not allowed.

7. The interface of claim 5 and wherein said plurality of protocols includes: CIM/XML/HTTP and SOAP/HTTP/WBEM.

8. The interface of claim 7 and wherein said translating means includes said reverse-translating means.

9. The interface of claim 1 and wherein said translating means includes said reverse-translating means.

10. The method of claim 1 and wherein said determining further comprises:

establishing a plurality of acceptable protocols;

comparing said first protocol against said plurality of acceptable protocols seriatim until said first protocol matches one of said plurality of protocols; and, allowing-said further processing.

11. The method of claim 10 and wherein the result of said operation of said comparing not obtaining a match is that said further processing is not allowed.

12. The method of claim 10 and wherein said plurality of protocols includes: CIM/XML/HTTP and SOAP/HTTP/WBEM.

13. The method of claim 12 and wherein said translating includes said reverse-translating.

14. In a storage system employed in a client-server network, a method for interfacing between a first protocol and a second protocol comprising:

receiving first information in accordance with said first protocol from said client;

determining that said first protocol is acceptable to allow further processing of said first information in said system;

translating, in response to said determining, said first information into second information compatible with said second protocol;

establishing an object manager operative in accordance with said second protocol;

forwarding said second information to said object manager and, responsive to said object manager managing said second information, receiving a managed response thereto from said object manager;

reverse-translating said managed response into an equivalent response compatible with said first protocol; and, forwarding said equivalent response to said client.

15. The method of claim 14 and wherein said first protocol is CIM/XML/HTTP.

16. The method of claim 15 and wherein said second protocol is WMI/DCOM.

17. The method of claim 16 and wherein said determining further comprises:

establishing a plurality of acceptable protocols;

comparing said first protocol against said plurality of acceptable protocols seriatim until said first protocol matches one of said plurality of protocols; and, allowing said further processing.

18. The method of claim 14 and wherein said translating includes said reverse-translating.

19. A computer program product for use on a computer to be operated within a client-server network employing a storage area network including at least one storage system, said computer program product functioning to interface between a first communication protocol and a second communication protocol and comprising a computer usable medium having computer readable program code thereon, said computer readable program code comprising:

program code for receiving first information in accordance with said first protocol from said client;

program code for determining that said first protocol is acceptable to allow further processing of said first information in said system;

program code, responsive to execution of said program code for determining, for translating said first information into second information compatible with said second protocol;

program code for establishing an object manager operative in accordance with said second protocol;

program code for forwarding said second information to said object manager and, responsive to said object manager managing said second information, receiving a managed response thereto from said object manager;

program code for reverse-translating said managed response into an equivalent response compatible with said first protocol; and, program code for forwarding said equivalent response to said client.

20. The computer program product of claim 19 and wherein said first protocol is CIM/XML/HTTP.

21. The computer program product of claim 20 and wherein said second protocol is WMI/DCOM.

22. The computer program product of claim 21 and wherein said program code for determining further comprises:

program code for establishing a plurality of acceptable protocols;

program code for comparing said first protocol against said plurality of acceptable protocols seriatim until said first protocol matches one of said plurality of protocols; and, program code for allowing said further processing.

23. The computer program product of claim 19 and wherein said program code for determining further comprises:

program code for establishing a plurality of acceptable protocols;

program code for comparing said first protocol against said plurality of acceptable protocols seriatim until said first protocol matches one of said plurality of protocols; and, program code for allowing said further processing.

24. The computer program product of claim 23 and wherein the result of operation of said program code for comparing not obtaining a match is that said further processing is not allowed.

25. The computer program product of claim 23 and wherein said plurality of protocols includes: CIM/XML/HTTP and SOAP/HTTP/WBEM.

26. The computer program product of claim 25 and wherein said program code for translating includes said program code for reverse-translating.

27. The apparatus of claim 26 and wherein said first information translator for translating includes said reverse translator for reverse-translating.

28. The computer program product of claim 19 and wherein said program code for translating includes said program code for reverse-translating.

29. Apparatus to be operated within a client-server network employing a storage area network including at least one storage system, said apparatus functioning to interface between a first communication protocol and a second communication protocol and comprising:

first information receiver for receiving first information in accordance with said first protocol from said client;

first protocol acceptor for determining that said first protocol is acceptable to allow further processing of said first information in said system;

first information translator, responsive to operation of said first protocol acceptor, for translating said first information into second information compatible with said second protocol;

an object manager operative in accordance with said second protocol;

forwarding and receiving apparatus for forwarding said second information to said object manager and, responsive to said object manager managing said second information, receiving a managed response thereto from said object manager;

reverse translator for reverse-translating said managed response into an equivalent response compatible with said first protocol; and, equivalent response forwarder for forwarding said equivalent response to said client.

30. The apparatus of claim 29 and wherein said first protocol is CIM/XML/HTTP.

31. The apparatus of claim 30 and wherein said second protocol is WMI/DCOM.

32. The apparatus of claim 31 and wherein said first protocol acceptor for determining further comprises:

plurality of protocols acceptor for establishing a plurality of acceptable protocols;

a comparator for comparing said first protocol against said plurality of acceptable protocols seriatim until said first protocol matches one of said plurality of protocols; and, further processing apparatus for allowing said further processing.

33. The apparatus of claim 29 and wherein said first protocol acceptor for determining further comprises:

plurality of protocols acceptor for establishing a plurality of acceptable protocols;

a comparator for comparing said first protocol against said plurality of acceptable protocols seriatim until said first protocol matches one of said plurality of protocols; and, further processing apparatus for allowing said further processing.

34. The apparatus of claim 33 and wherein the result of operation of said comparator not obtaining a match is that said further processing is not allowed.

35. The apparatus of claim 29 and wherein said first information translator for translating includes said reverse translator for reverse-translating.

36. The apparatus of claim 33 and wherein said plurality of protocols includes: CIM/XML/HTTP and SOAP/HTTP/WBEM.

37. In a client-server network, an interface operating between a first protocol and a second protocol, said server including an object manager operative in accordance with said second protocol, said interface configured to:

receive first information in accordance with said first protocol from said client;

determine, in response to receiving said first information, that said first protocol is acceptable to allow further processing of said first information in said server;

translate, in response to determining said first protocol acceptable, said first information into second information compatible with said second protocol;

forward said second information to said object manager and, responsive to said object manager managing said second information, receive a managed response thereto from said object manager;

reverse-translate said managed response into an equivalent response compatible with said first protocol; and, forward said equivalent response to said client.

38. In a client-server network, a method for interfacing between a first protocol and a second protocol comprising:

receiving first information in accordance with said first protocol from said client;

determining that said first protocol is acceptable to allow further processing of said first information in said server;

translating, in response to determining that said first protocol is acceptable, said first information into second information compatible with said second protocol;

establishing an object manager operative in accordance with said second protocol;

forwarding said second information to said object manager and, responsive to said object manager managing said second information, receiving a managed response thereto from said object manager;

reverse-translating said managed response into an equivalent response compatible with said first protocol; and, forwarding said equivalent response to said client.

39. A computer program product for use on a computer to be operated within a client-server network, said computer program product functioning to interface between a first communication protocol and a second communication protocol and comprising a computer usable medium having computer readable program code thereon, said computer readable program code comprising:

program code for receiving first information in accordance with said first protocol from said client;

program code for determining that said first protocol is acceptable to allow further processing of said first information in said server;

program code, responsive to execution of said program code for determining, for translating said first information into second information compatible with said second protocol;

program code for establishing an object manager operative in accordance with said second protocol;

program code for forwarding said second information to said object manager and, responsive to said object manager managing said second information, receiving a managed response thereto from said object manager;

program code for reverse-translating said managed response into an equivalent response compatible with said first protocol; and, program code for forwarding said equivalent response to said client.

* * * * *